United States Patent Office 2,937,559
Patented May 24, 1960

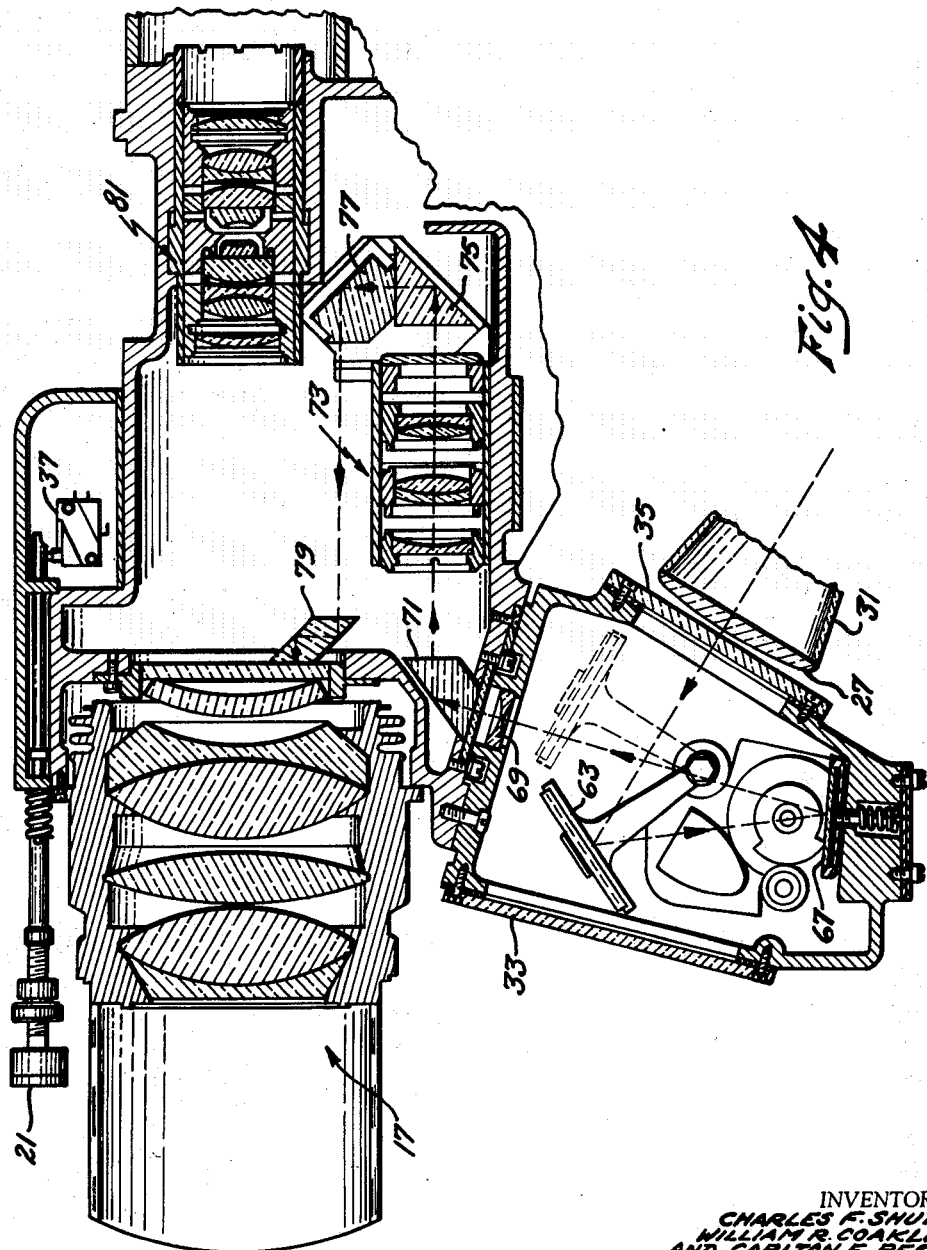

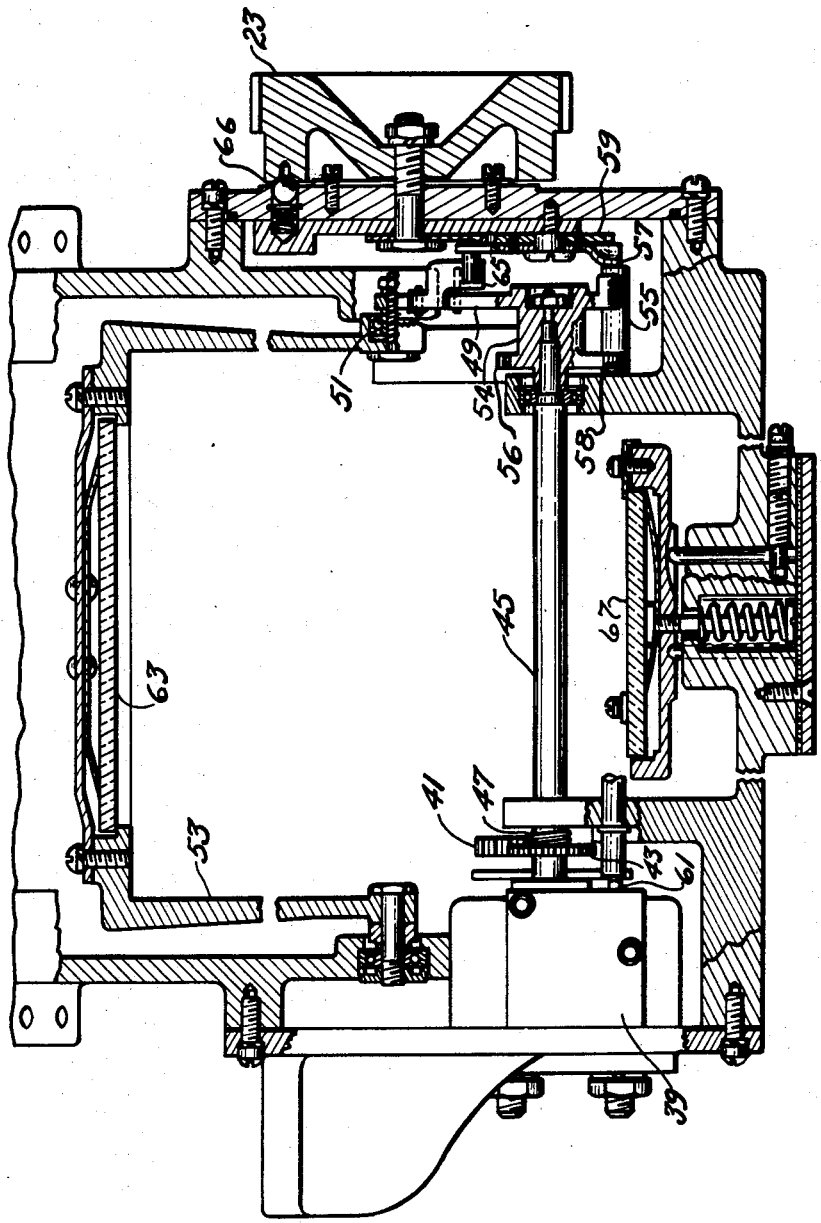

2,937,559

ARRANGEMENT FOR THE CONCURRENT VIEWING OF RADAR AND TELESCOPIC IMAGES

Charles F. Shute and William R. Coakley, Rochester, and Carlton F. Peck, Great Neck, N.Y., assignors to the United States of America as represented by the Secretary of the Air Force Filed Dec. 5, 1957, Ser. No. 700,916

4 Claims. (Cl. 88—1)

This invention relates generally to a means of presenting a radar picture either for direct viewing or for viewing through the eyepiece of an optical instrument. More particularly, the invention is concerned with the attachment of a radar indicator unit to a telescopic sight in such a manner that the operator can either view the radar screen directly or can cause the image on the screen to be projected onto the focal plane of the telescope so that both the telescopic and radar images can be simultaneously viewed.

Reference is made to a copending application Serial No. 653,720, filed April 18, 1957, in the names of Carlton F. Peck and Theodore F. Newman, and entitled, Hemispheric Sighting Device, in which is disclosed certain features of the device herein shown, described, and claimed but which are not encompassed within the scope of the claims appended thereto.

One of the particular problems encountered in the protection of an aircraft from enemy aircraft intent upon attack is the necessity of the operator of the defensive armament to search for, detect, and track the enemy and then, when the enemy aircraft comes within range, to accurately fire his guns against the targets. In modern defensive fire control systems much of this operation is carried out automatically. However, the operator is still required to manipulate many controls in a limited time and must be highly skilled and trained in order to accomplish his function with maximum efficiency. Besides controlling the sight, the operator must observe the radar screen and telescopic images so that he will be able to actually see the aircraft at which he is shooting, both visually and by radar indication.

The view of the enemy aircraft on the radar scope would ordinarily appear as a blip or shapeless spot. Little information can be gained as to size, shape, or color marking of the enemy aircraft from this radar image. Ideally, the operator would be able to visually observe the enemy aircraft or target through the telescope and at the same time determine its azimuth, elevation, and range by observing the radar scope display. This would, of course, require that the operator of the sight look into both the telescope and radar screen simultaneously. The viewing of these two separated displays is physically tiring and would lead to fatigue of the operator, especially when he is required to simultaneously manipulate many other controls on the complicated gun sight. Since the safety of the aircraft to be protected is dependent on the operator's constant and careful effort, any device which would help to prevent excessive fatigue by simplifying the operation of the sight would be extremely important in the termination of the basic mission of the aircraft in success.

Accordingly, it is a primary object of this invention to provide a means for projecting a radar image onto the focal plane of the eyepiece of a telescope which is sighted so as to observe the same target that the radar instrument is following.

Another object of the invention is to provide improved means for simultaneously observing a target, such as an enemy aircraft, through both a telescopic eyepiece and a radar display projected onto the focal plane of said telescopic eyepiece.

A still further object of the invention is to increase the efficiency of a telescopic sight by including therein a means for projecting a radar image into the operator's field of view thereby allowing the operator to instantaneously determine the azimuth, elevation, and range of the target which is visible in the telescope.

Another object of the invention is to provide a telescopic sight having operator controlled actuating for transferring a radar image from a direct viewing screen through a series of mirrors and prisms and onto the focal plane of the eyepiece of the telescope so that both the radar and telescopic images can be viewed simultaneously.

A feature of the invention includes the use of anamorphic optics to transform the rectangular image on the radar screen to a square image in the eyepiece focal plane of the eyepiece in order to make the best possible use of the space available there.

These and other objects, features, and advantages will become more apparent after considering the following detailed description taken in connection with the annexed drawings and appanded claims.

In the drawings, wherein like reference characters refer to like parts throughout the several views.

Fig. 4 is a side elevation of the eyepiece end of the telescopic sight showing the optical arrangement after the headswitch has been depressed and the mirror has acted to divert the radar image onto the eyepiece focal plane of the telescopic sight, including, in dotted lines, the original out-of-the-way position of the image diverting radar mirror; and Fig. 5 is a front elevation of the radar mirror system and the mechanism employed to control the mirror and divert the radar image so that it can be viewed by looking in the telescope eyepiece.

Figure 1:
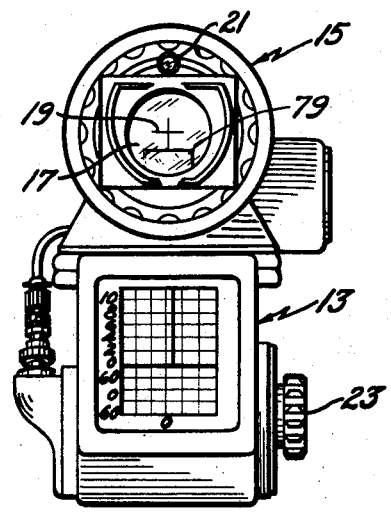
Fig. 1 is a view of the telescopic sight as seen by the operator showing the radar screen and telescopic eyepiece before a target has been sighted.

Referring now to Fig. 1, there is shown a view of the telescopic sight including the normal field of view as seen by the operator at the start of the scanning operation. The radar scope 13 is automatically searching the area to be guarded. The telescope 15 is aimed in the same direction as the radar scope 13 and is scanning the same area. It will be noted that at the start of the scanning operation as shown in Fig. 1 the telescope eyepiece 17 is blank except for the cross hairs 19 and prism 79. A headswitch 21, which functions when the operator looks into the telescope eyepiece 17, is located above the central axis of the telescope 15 and controls an electrical solenoid means which determines the viewing location of the radar image depending upon the position of said headswitch 21. Also attached to the sight is a radar mirror knob 23 which the operator may use to manually control the viewing location of the radar image in case of failure of the headswitch 21.

Figure 2:
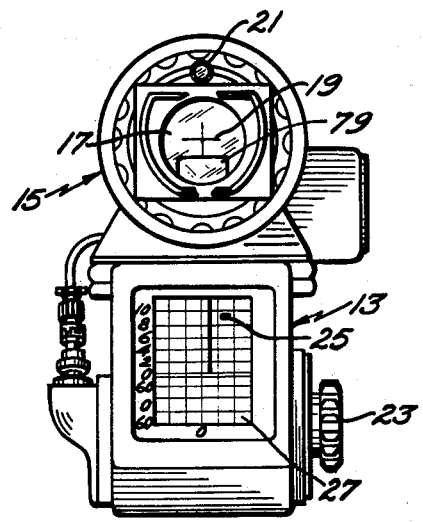
Fig. 2 is a view of the sight immediately after the search radar has sighted the target.

When a target, such as an enemy aircraft, approaches within range of the radar, a bright spot 25 appears on the radar indicator scope screen 27, as shown in Fig. 2. By properly interpreting the radar scope presentation, the operator is able to determine the range, elevation, and azimuth of the target but cannot identify the plane as to color and type. In order to exactly identify the target it is necessary for the operator to visually perceive it, preferably through a telescope. However, this would require that the operator see both the radar and telescopic images at the same time. Therefore, a special arrangement is necessary to place the two images in adjacent positions to each other so that they may be viewed simultaneously.

Figure 3:
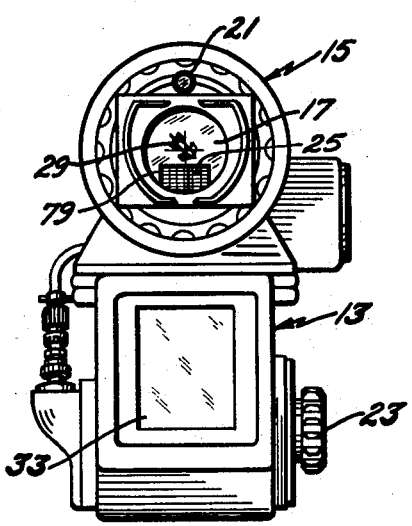
Fig. 3 is a view of the sight after the target has come within the visual range of the telescope and the radar image has been diverted to the eyepiece focal plane so that both the radar and telescopic images can be viewed simultaneously.

In Fig. 3, there is shown a view which includes the sight as it appears to the operator when he looks into the telescopic eyepiece 17. It will be noted that the radar window 33 is blank. This is a result of the depression of headswitch 21 caused by the positioning of the operator whereby he is able to look into the telescopic eyepiece 17. In this position the operator is able to see the telescopic image 29 of the target plane as well as the radar image of the same target.

The transformation of the radar image onto the focal plane of the telescopic eyepiece is accomplished as shown in Figs. 4 and 5 by utilizing a group of specially mounted prisms in association with a mirror system. As shown in Fig. 4, under ordinary conditions the radar image impinges on the cathode ray tube 31 of the radar scope. The operator, sitting in a relaxed position, can see the radar image by looking through the windows 33 and 35. As soon as he observes a blip 25, shown in Fig. 2, on the screen 27 of the automatically scanning radar, he moves from his relaxed position to a more upright position in order to look into the telescopic eyepiece 17. As he does this his helmet (not shown) contacts and depresses a headswitch 21 which operates an electrical microswitch 37.

The action of said microswitch 37 energizes a rotary solenoid 39, shown in Fig. 5 which in turn rotates the sector gear 41. The driven gear 43 rotates the shaft 45 through the spring clutch 47. The clutch allows for overrun of the solenoid. The mirror actuating lever 49 on the other end of the shaft 45 has a ball bearing 51 which engages the channel section of the mirror mount which is part of the mirror bracket assembly 53. Integral with the mirror actuating lever 49 is a member 54, the ends of which form stops 56 and 58 which act against the switch actuating rod 55 to limit the extent of mirror rotation.

It is also possible to rotate the mirror by means of the manual operating knob 23. As soon as the knob 23 is rotated from its center detent position, the cam lobe 57 of the lever and gear assembly 59 presses against the end of the switch actuating rod 55, the other end of which depresses the switch 61 on the solenoid 39 making the solenoid inoperative. Thereafter, actuation of the headswitch 21 will have no effect on the mirror 63 while it is being controlled manually by the knob 23. The pin 65 on the lever and gear assembly 59 strikes the mirror actuating lever 49 and moves the mirror 63 as before. Detent 66 on the knob 23 locks the mirror 63 either in or out of the light path.

This feature of allowing the operator to deactivate the headswitch 21 is especially useful in certain circumstances. For example, if for some particular reason the operator of the gun wished to observe the target through the telescope 15 without seeing the reflected radar image in the eyepiece 17, he need only turn the radar mirror knob 23 enough to remove it from the center detent position. This automatically deactivates the headswitch 21 and subsequently when the operator looks into the telescope 15 thereby depressing the headswitch 21, the solenoid 39 is inoperative.

Fig. 4 clearly shows the path of the radar image from the face of the cathode ray tube 27 to the telescopic eyepiece 17 when the mirror 63 is in the reflecting position. The radar image from the cathode ray tube 31 passes through the window 35 and strikes the mirror 63 which is positioned to reflect the image to another mirror 67. This mirror 67 reflects the image and sends it through a concavo-concave lens 69 to a prism 71 which in turn causes the image to be reflected through an anamorphic lens system 73 to the prism 75. Adjacent to this prism 75 is another prism 77 which receives the image and reflects it toward the prism 79. The prism 79 reflects the image upward and inward toward the lower portion of telescope eyepiece 17 where it can be seen by the operator when he looks into the telescope. Thus, the radar image can now be seen in the telescope eyepiece 17 and at the same time the operator, by looking through the upper portion of the telescope, can also see the actual target which the radar image represents when and if it comes within range of the telescope. The telescopic image of the target, of course, passes through the telescopic lens system 81 and directly into the eyepiece 17.

The operator, using the information received from the radar image in the telescopic eyepiece, can now actuate the firing mechanism of the guns and then see directly and instantaneously the results of his shooting both visually and by observing the changes in the radar signal.

Having thus disclosed our invention, in conjunction with a preferred embodiment thereof, it is obvious that various changes may be made in the specific apparatus and structure as disclosed in the drawings and described in the specification without departing from the spirit of the invention as defined by the accompanying claims.

We claim:

1. In a telescopic gun sight which includes an eyepiece and a radar controlled scanning system in combination therewith, said radar system including a screen arranged to be directly viewed by the operator of said gun sight, a rotatable mirror arranged to be rotated into the light path of the image from said radar screen, means associated with said mirror for further reflecting said reflected radar image, a plurality of fixed optical elements through which said reflected image is directed by said associated means onto the focal plane of the eyepiece of said telescope, and means to facilitate selective, direct observation by the operator of both the radar and telescopic image concurrently on juxtaposed portions of the focal plane of said eyepiece.

2. In a telescopic gun sight which includes an eyepiece and a radar controlled scanning system in combination therewith, said radar system including a screen arranged normally to be directly viewed by the operator of said gun sight, a rotatable mirror assembly, manual means associated with said mirror for rotating said mirror into position to intercept the image from said radar screen, a system of reflectors arranged to intercept the reflected radar image from said rotatable mirror and direct said reflected radar image along a path substantially directionally coincident with the light path through said gun sight, a lens system for focussing said radar image on the focal plane of said eyepiece, and means to facilitate selective, direct observation by the operator of both the radar and telescopic images concurrently on juxtaposed portions of the focal plane of said eyepiece.

3. In the combination as claimed in claim 2 having power means for rotating said mirror, and wherein said manual means for rotating said mirror into position to intercept the image from said radar screen includes means for preventing energization of said power means during manual operation of the rotatable mirror.

4. In combination, a telescopic gun sight having an eyepiece and a radar controlled scanning system mounted adjacent thereto, said telescopic sight and said radar system arranged to be viewed separately and directly by an operator, reflecting means arranged to intercept and direct the image from said radar system to the eyepiece focal plane of said telescopic sight, power means constructed and arranged to move said reflecting means into intercepting position, switching means located adjacent to the eyepiece of said telescopic sight selectively operative to energize and control said power means, a plurality of fixed optical members interposed in the path of the reflected radar image for further reflecting and focussing said radar image on the eyepiece focal plane of said telescopic sight, said plurality of fixed optical members including an anamorphic lens system arranged to form a substantially square image on the eyepiece focal plane of the telescopic sigh from the normally rectangular reflected radar image, and means to facilitate selective, direct observation by the operator of both the radar and telescopic images concurrently on juxtaposed portions of the focal plane of said eyepiece.

References Cited in the file of this patent

UNITED STATES PATENTS

| | | |
|---|---|---|
| 2,426,184 | Deloraine | Aug. 26, 1947 |
| 2,464,195 | Burley | Mar. 8, 1949 |
| 2,492,353 | Brackett | Dec. 27, 1949 |
| 2,508,562 | Bonner | May 23, 1950 |
| 2,539,405 | Deloraine | Jan. 30, 1951 |
| 2,561,924 | Hellen | July 24, 1951 |